United States Patent

Hudson et al.

[11] Patent Number: 5,988,319
[45] Date of Patent: Nov. 23, 1999

[54] TRANSMISSION FOR A RETURN-TO-NORMAL ACTUATOR

[75] Inventors: Hugh F. Hudson, Wauwatosa; Dennis J. Ulicny, Waukesha, both of Wis.

[73] Assignee: Johnson Service Company, Milwaukee, Wis.

[21] Appl. No.: 08/865,461

[22] Filed: May 29, 1997

Related U.S. Application Data

[63] Continuation-in-part of application No. 08/683,737, Jul. 17, 1996, Pat. No. 5,758,684, which is a continuation-in-part of application No. 08/388,722, Feb. 15, 1995, abandoned.

[51] Int. Cl.⁶ .............................. F03G 1/08; F16K 31/44
[52] U.S. Cl. .............................. 185/40 R; 251/69; 475/4
[58] Field of Search .............................. 475/4; 185/40 R; 251/69

[56] References Cited

U.S. PATENT DOCUMENTS

| | | | |
|---|---|---|---|
| 1,784,094 | 12/1930 | Fletcher | 251/229 |
| 2,674,903 | 4/1954 | Doster | 74/508 |
| 2,930,571 | 3/1960 | Vogl | 251/69 |
| 3,279,744 | 10/1966 | Fieldsen et al | 251/130 |
| 3,808,895 | 5/1974 | Fitzwater | 251/69 X |
| 4,090,589 | 5/1978 | Fitzwater | 251/71 X |
| 4,113,063 | 9/1978 | Troy | 185/40 R |
| 4,440,382 | 4/1984 | Pruvot et al. | 251/248 |
| 4,533,114 | 8/1985 | Cory et al. | 251/67 |
| 4,621,789 | 11/1986 | Fukamachi | 251/129 |
| 4,669,578 | 6/1987 | Fukamachi | 185/40 R |
| 4,741,508 | 5/1988 | Fukamachi | 251/71 |
| 4,881,420 | 11/1989 | Paul, Jr. | 74/109 |
| 4,920,811 | 5/1990 | Hopper | 74/2 |
| 5,182,498 | 1/1993 | Stuhr | 318/15 |
| 5,310,021 | 5/1994 | Hightower | 185/40 R |
| 5,518,462 | 5/1996 | Yach | 475/149 |

*Primary Examiner*—Allan D. Herrman
*Attorney, Agent, or Firm*—Quarles & Brady

[57] ABSTRACT

An apparatus for effecting actuation of a device. The device has a home position and a set position and the apparatus returns the device to the home position upon loss of power to the apparatus. In its preferred embodiment, the apparatus includes a drive motor for providing a driving force to a drive shaft, and a bias member having a cocking mechanism and a release mechanism. The bias member provides a bias force to a bias shaft when the cocking mechanism is cocked and the release mechanism is released; the release mechanism is released when power is lost to the actuator. The preferred embodiment of the apparatus further includes a drive member which delivers an actuating force to an actuating shaft in response to forces received on an input shaft. Still further, the apparatus preferably includes a transmission mechanism coupled with the drive shaft, with the bias shaft, and with the input shaft. The transmission mechanism delivers the driving force to the bias shaft when a clutch gear arrangement is engaged with the transmission mechanism. The transmission member delivers the driving force to the input shaft when the bias shaft is locked. The transmission mechanism delivers the bias force to the input shaft when the power is lost to the actuator.

10 Claims, 4 Drawing Sheets

| | VIEW ACQUISITION TIME | |
|---|---|---|
| | TRANSMISSION SOURCE OFF | TRANSMISSION SOURCE ON |
| EMISSION SET 1 | EMISSION DATA 1 | EMISSION DATA 2 |
| EMISSION SET 2 | EMISSION DATA 3 | EMISSION DATA 4 |
| EMISSION SET 3 | CROSSTALK DATA | TRANSMISSION |
| EMISSION SET 4 | SCATTER DATA 1 | SCATTER DATA 2 |

TRANSMISSION FOR A RETURN-TO-NORMAL ACTUATOR

CROSS-REFERENCE TO RELATED APPLICATIONS

This application is a continuation-in-part of U.S. application Ser. No. 08/683,737 filed Jul. 17,1996, now U.S. Pat. No. 5,758,684, which is a continuation-in-part of U.S. patent application Ser. No. 08/388,722, filed Feb. 15,1995 now abandoned. This application is related to commonly assigned U.S. application No. 08/865,455 filed of even date herewith and entitled "Smart Actuator Control" the disclosure of which is hereby expressly incorporated herein by reference.

BACKGROUND OF THE INVENTION

The invention relates generally to an actuator. In particular, the invention relates to an electromechanical actuator for actuating a valve or damper in a fluid distributing system, such as an air conditioning system or a heating system where the actuator must return the valve or damper to a "home" position when power is lost (return-to-normal). Conventional prior art return-to-normal actuators contain a return spring that is almost always coupled to the gear train that transmits power from a drive motor to the output which effects actuation. Because the spring in such a device is always in the gear train, a large drive motor and robust gears are required to supply appropriate torque to drive the load experienced because of the valve or damper being actuated, and also to supply torque to oppose the torque of the spring. As motor size increases, motor current draw also increases. Generally, motor cost also increases with motor size. Such increased current causes thermal problems for the actuator, for the drive electronics, and for the motor. Further, in such prior art devices where the spring is always coupled to the gear train, the spring is cycled every time the drive motor is cycled, thereby presenting significant fatigue problems for the spring. Typically, the life of such prior art return-to-normal actuators is limited by the fatigue life of the spring.

It would, therefore, be useful to have a return-to-normal actuator for use with valves, dampers, or other actuation environments which initially winds a spring or other bias device and then decouples that spring from the gear train. Such a device would allow the motor to drive only the load provided by the damper, valve, or other device being actuated during normal operation. Once power to the actuator is removed, the spring is recoupled to the gear train and the spring drives the output shaft to its predetermined normal position.

SUMMARY OF THE INVENTION

The invention is an apparatus for effecting actuation of a device. The device has a certain range of operation and a home position and a set position within that range, and the apparatus returns the device to the home position upon loss of power to the apparatus. In its preferred embodiment, the apparatus comprises a drive motor for providing a driving force to a drive shaft, and a bias member having a cocking mechanism and a release mechanism. The bias member provides a bias force to a bias shaft when the cocking mechanism is cocked and the release mechanism is released; the release mechanism is released when power is lost to the actuator. The preferred embodiment of the apparatus further comprises a drive member which delivers an actuating force to an actuating shaft in response to forces received on an input shaft. Still further, the apparatus preferably comprises a transmission mechanism coupled with the drive shaft, with the bias shaft, and with the input shaft. The transmission mechanism delivers the driving force to the bias shaft when the input shaft is locked. The transmission member delivers the driving force to the input shaft when the bias shaft is locked. The transmission mechanism delivers the bias force to the input shaft when the drive shaft is locked and the power is lost to the actuator.

In the preferred embodiment, the bias member comprises a spring and the cocking mechanism comprises a solenoid brake which is set when the spring is wound. In this embodiment, the release mechanism engages the brake and is responsive to the power provided to the apparatus; the release mechanism releases the brake when the power is lost.

Further in the preferred embodiment of the present invention, the transmission mechanism includes a planetary gear assembly having a first input-output shaft coupled with the drive shaft, a second input-output shaft coupled with the bias shaft, and a third input-output coupled with the input shaft.

One element of a practical embodiment of the invention is employment of a speed limiting device during the return-to-normal cycle. The bias member may drive the valve or damper at a speed high enough to cause damage when the home position is reached. To prevent this, a speed limiting device in the form of a dynamic brake may be included in the apparatus that applies a retarding torque to counter the force provided by the bias member. The amount of such retarding torque may be directly proportional to the speed at which the bias member drives the bias shaft. One such dynamic brake is a centrifugal brake which is coupled to the bias shaft and is driven by a dedicated gear train. The dedicated gear train may, for example, step up the speed of the bias shaft from about 5 rpm to about 1,000 rpm.

In such an arrangement which uses a centrifugal brake, the brake which locks the bias shaft in position once the spring is wound up actually engages the centrifugal brake. This is advantageous because the braking torque required at the centrifugal brake in such a configuration is much lower than the braking torque which would be required if the centrifugal brake were engaged directly with the bias shaft. Thus, a smaller brake may be employed when the centrifugal brake is coupled as indicated with respect to the brake which locks the bias shaft.

In an alternate embodiment of the present invention, the transmission mechanism employs a differential gear mechanism having a first input-output shaft coupled with the drive shaft, a second input-output shaft coupled with the bias shaft, and a third input-output shaft coupled with the input shaft.

In still another embodiment of the present invention, the transmission mechanism employs a second gear arrangement for facilitating setting of bias member, such as a spring.

It is, therefore, an object of the present invention to provide an apparatus for effecting actuation of a device which employs a single motor for providing drive force and for setting a bias member, such as a spring.

A further object of the present invention is to provide an apparatus for effecting actuation of a device which decouples the bias member from the gear train to allow the drive motor to drive only the actuator output shaft during normal operation.

A still further object of the present invention is to provide an apparatus for effecting actuation of a device which automatically allows the bias member to be coupled to the gear train and drive the output shaft to a predetermined home position upon loss of power to the apparatus.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
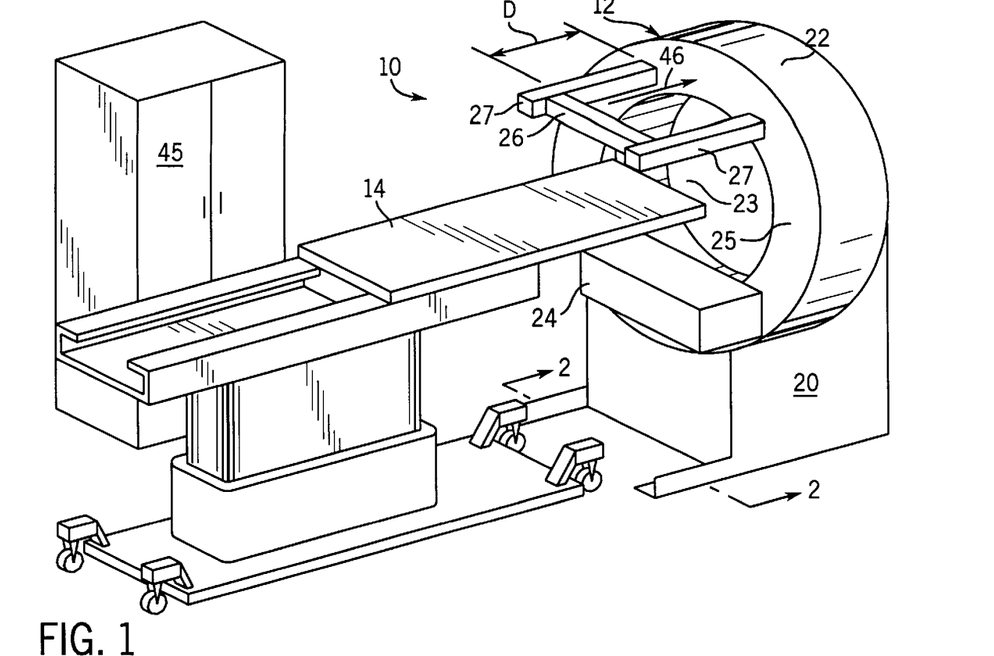
FIG. 1 is a schematic block diagram of the preferred embodiment of the present invention.

FIG. 1 is a schematic block diagram of the preferred embodiment of the present invention.

In FIG. 1, an apparatus 10 is illustrated as including a drive motor 12 connected by a drive shaft 14 to a transmission member 16. Transmission member 16 includes a planetary gear head assembly 46. Transmission member 16 is connected with a bias member 18 via a bias shaft 20, and is connected with a drive member 22 via an input shaft 24.

For purposes of this disclosure, the term "shaft" is intended to include any mechanical coupling such as a solid or hollow shaft, a flexible coupling, a gear train, or the like.

Drive member 22 includes an interface 26 to which input shaft 24 is coupled, and a coupling 28 which is connected with interface 26 via a shaft 30. Drive member 22 is connected with an actuated device, such as a valve or damper 32. The connection between valve 32 and drive member 22 is effected by an actuating shaft 34. A brake 35 is coupled with bias member 18 via a coupling 37. A logic/control device 36 is coupled via a network 38 with drive motor 12 and brake 35. Logic/control device 36 may also be coupled with valve 32. A memory 40 is coupled with logic/control device 36 via a line 42.

Figure 2:
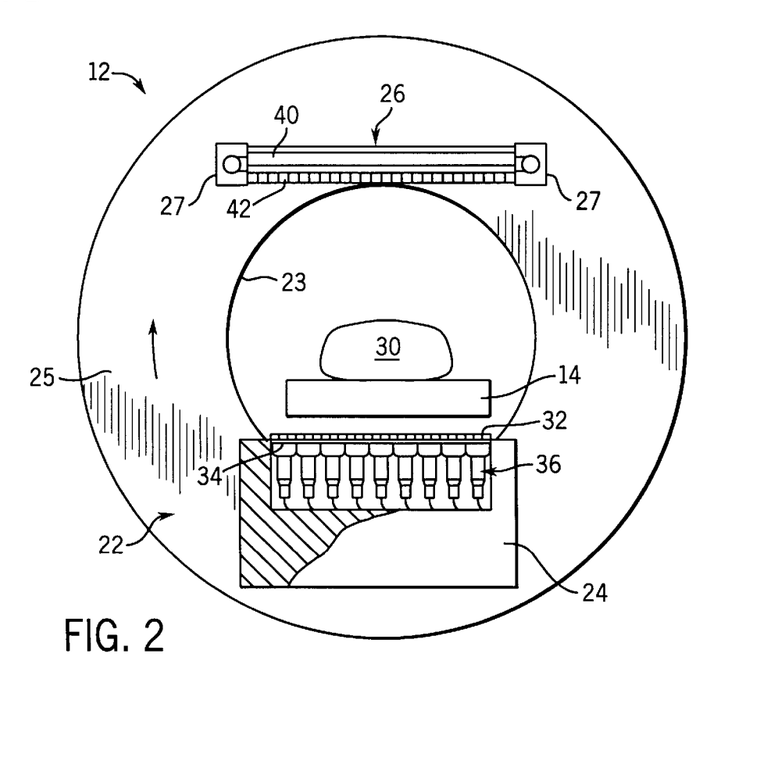
FIG. 2 is a schematic perspective illustration of details of the drive train of the preferred embodiment of the present invention when the input shaft is locked and the motor is winding the spring.

FIG. 2 is a schematic perspective illustration of details of the drive train of the preferred embodiment of the present invention when the input shaft is locked and the motor is winding the spring.

In order to facilitate understanding the present invention, like elements will be indicated using like reference numerals in the various drawings.

In FIG. 2, drive motor 12 rotates drive shaft 14 to transmit rotational force to transmission member 16. Transmission member 16 is coupled with bias shaft 20; bias shaft 20 is connected with bias member 18. A brake 35 is coupled via a coupling 37 with bias member 18; in the embodiment illustrated in FIG. 2, coupling 37 is connected with bias member 18 via bias shaft 20. Transmission member 16 is further connected with input shaft 24 which transmits rotational forces to coupling 28 for further transfer via actuating shaft 34 (not shown in FIG. 2). Coupling 28 is representatively illustrated as a sector gear in FIG. 2. Actuating shaft 34 is preferably configured for coupling with coupling 28 via an aperture 29 in order to establish connection between valve 32 (not shown in FIG. 2) and actuator 28.

Of particular interest in FIG. 2 is the illustration of the preferred embodiment of transmission member 16. In particular, transmission member 16 is comprised of a drive gear 44 which is engaged with drive shaft 14. Drive gear 44 receives rotational force imparted by drive shaft 14 and transmits that rotational force to a planetary gear head assembly 46. The planetary gears 47 are mounted on a carrier member 51 having a shaft 50 projecting therefrom. Planetary gear head assembly 46 interacts with a transmission gear 48 via a shaft 50 to impart rotational motion to input shaft 24 under appropriate circumstances to be described in greater detail hereinafter.

As previously established, FIG. 2 illustrates details of the drive train embodying transmission member 16 of the preferred embodiment of the present invention when input shaft 24 is locked. Input shaft 24 may become locked during particular operations of apparatus 10 (FIG. 1) such as when valve 32 is fully traveled to one extreme or the other of its available travel. Such movement by a valve to an extreme of its available travel may occur, for example, when valve 32 reaches a predetermined home position or a predetermined upper limit set position.

In operation, such a home position may, for example, be a normally open or a normally closed position establishing one extreme of the travel of valve 32. The set position may be any position other than the home position, but commonly is the other extreme of travel of the valve 32 from its predetermined home position. Thus, when an extreme of travel of valve 32 is reached, actuating shaft 34 (FIG. 1) cannot further rotate in the direction urging valve 32 toward its limit. Consequently coupling 28 and input shaft 24 are effectively locked. It is under such conditions that the characteristics of planetary gear head assembly 46 are advantageously employed in the present invention.

A planetary gear head assembly operates to transmit rotation forces among its input/output couplings, depending upon which of those input/output couplings may be locked. In the situation illustrated in FIG. 2 planetary gear head 46 has three input/output couplings: drive shaft 14, bias shaft 20, and input shaft 24 and has planetary gears 46 and a sun gear 49. When input shaft 24 is locked (as when valve 32 has reached a limit of its travel), rotational force from drive shaft 14 in, for example, a clockwise direction (FIG. 2) is transmitted to drive gear 44. Drive gear 44 is urged to rotate in a counterclockwise direction and, since input shaft 24 is locked, planetary gear head assembly 46 will transmit a rotational force in a clockwise rotation via its stator ring 52. In turn, stator ring 52 will urge bias shaft 20 in a counterclockwise direction. A spring 54, which comprises the preferred embodiment of bias member 18, is oriented within a stationary case 56 appropriately that counterclockwise rotation of bias shaft 20 serves to wind up spring 54 within case 56, thereby storing kinetic energy in bias member 18. During such winding up operations, brake 35 is controlled by logic/control member 36 via network 38 (FIG. 1) to remain deenergized, and coupling 37 rides with respect to bias shaft 20 in a manner similar to an idler gear or cam.

Figure 3:
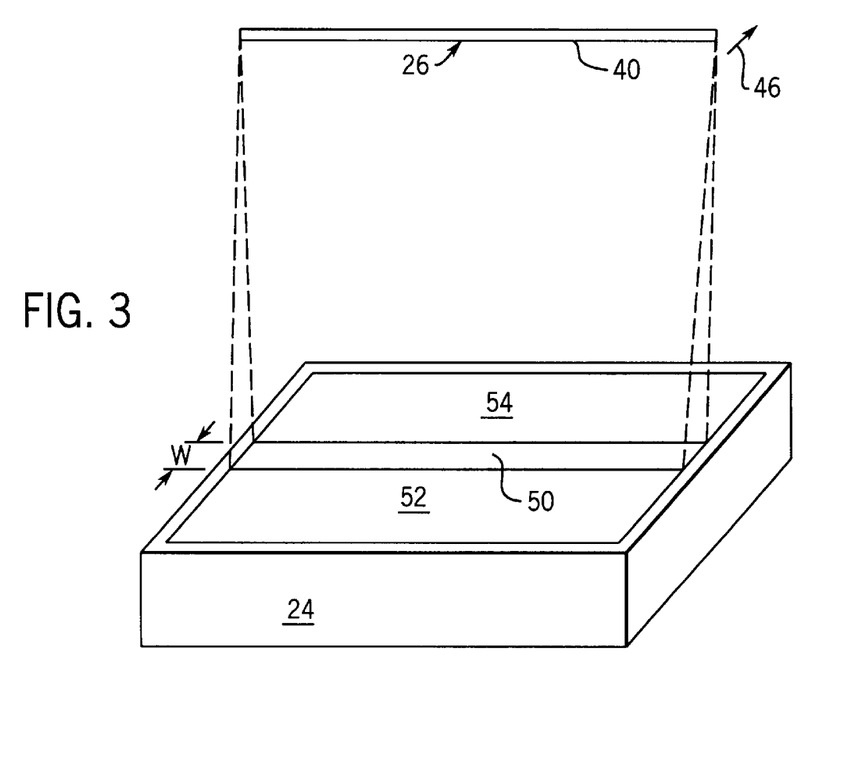
FIG. 3 is a schematic perspective illustration of details of the drive train of the preferred embodiment of the present invention during normal operation.

FIG. 3 is a schematic perspective illustration of details of the drive train of the preferred embodiment of the present invention during normal operation. In FIG. 3, spring 54 has been wound. Logic/control member 36 has sensed the state of spring 54 and has communicated via network 38 with brake 35 so that brake 35 is set. Coupling 37 interacts with bias shaft 20 to lock bias shaft 20 and prevent transmission of kinetic energy stored in spring 54 via bias shaft 20 to planetary gear head assembly 46. In such normal operation, valve 32 (FIG. 1) is freely moving between its home position and its set position, that is within its limits of travel. Thus, actuating shaft 34, engaging aperture 29 of coupling 28, is free to move in either a counterclockwise or a clockwise direction to open, close or otherwise position valve 32 within its limits of travel. Accordingly, for illustration purposes, in FIG. 3 drive motor 12 is rotating drive shaft 14 in a clockwise direction to urge drive gear 44 in a counterclockwise direction. Since bias shaft 20 is now locked against rotation by brake 35 and coupling 37, planetary gear head assembly 46 has its stator ring 52 locked and, therefore, transmits forces received via drive gear 34 to shaft 50. Shaft 50 rotates in a counterclockwise direction and interacts with transmission gear 48 to impart a clockwise rotation to input shaft 24. Input shaft 24 interacts with coupling 28 to impart a counterclockwise rotation to actuating shaft 34 (not shown in FIG. 3) interfitting in aperture 29 of coupling 28. Similarly, drive motor 12 may impart a counterclockwise rotation to drive shaft 14, and so long as valve 32 is still within its travel limits and thus no locking out of actuating shaft 34 occurs, such a counterclockwise rotation imparted to drive shaft 14 will result in a clockwise rotation of coupling 28 and clockwise rotation of actuating shaft 34.

Figure 4:
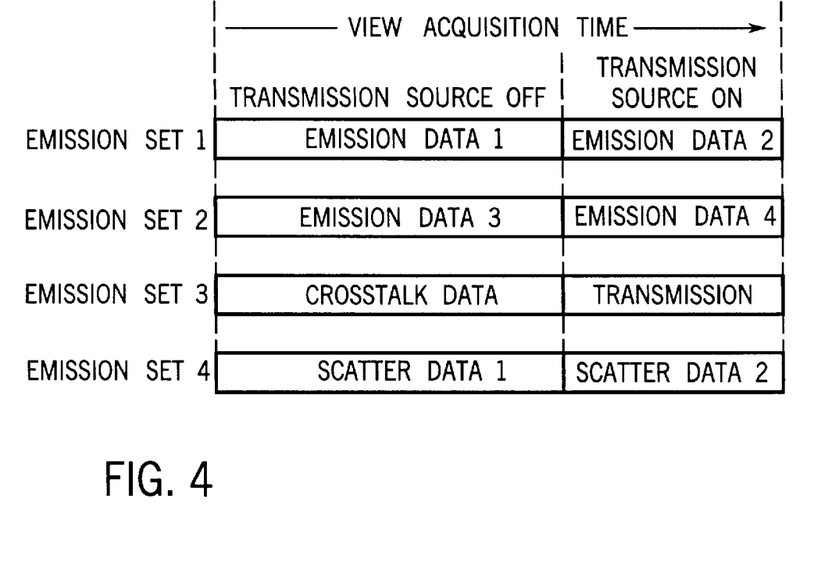
FIG. 4 is a schematic perspective illustration of details of the drive train of the preferred embodiment of the present invention when power is lost, the spring brake is released, and the spring is returning the valve or damper to the home position.

FIG. 4 is a schematic perspective illustration of details of the drive train in the preferred embodiment of the present invention when power is lost, the spring brake is released, and the spring is returning the valve or damper to the home position.

In FIG. 4, power has been lost to apparatus 10. The detent torque of drive motor 12 is designed to be sufficient to preclude turning drive shaft 14 by forces which may be applied to drive shaft 14 by the apparatus illustrated in FIG. 4 or by hand. Consequently, drive shaft 14 is effectively locked against rotation. The loss of power to drive motor 12 is sensed by logic/control device 36 via network 38, and logic/control device 36 effects unlocking of brake 35 via network 38 in response to such loss of power.

The return-to-normal cycle begins when power is lost to actuator 10. In an application when, for example, power is lost in a building, some valves and dampers must return to a home position to avoid damage to the building or discomfort to the building's occupants. Even though some return-to-normal actuators may have their brakes released by a logic/control device, it is more reliable to design the brake to release on its own upon loss of power. Thus, in the preferred embodiment of apparatus 10, brake 35 is a solenoid brake which is kept in an engaged (i.e., braking) orientation by the power supplied to apparatus 10. In such a configuration, loss of power to apparatus 10 automatically releases brake 35.

With brake 35 released, coupling 37 no longer locks bias shaft 20 and kinetic energy stored in spring 54 can now be released to impart a clockwise rotation to bias shaft 20 (note that the rotation to release kinetic energy (FIG. 4) is effected in a direction opposite to the direction of rotation of bias shaft 20 in imparting or storing kinetic energy in spring 54 (FIG. 2)). Clockwise rotation of bias shaft 20 is imparted to planetary gear head assembly 46 via its stator ring 52 urging stator ring 52 to rotate in a counterclockwise direction. Since drive shaft 14 is locked, drive gear 44 is locked, and, therefore, planetary gear head 46 transmits rotational force applied to its stator ring 52 to shaft 50 to rotate shaft 50 in a counterclockwise direction. Counterclockwise rotation of shaft 50 imparts a clockwise rotation to transmission gear 48 and input shaft 24 which, in turn, imparts a counterclockwise rotation to coupling 28. Consequently, actuating shaft 34 (not illustrated in FIG. 4) via its fitting within aperture 29, is rotated counterclockwise. It is preferred that such counterclockwise rotation of coupling 28 effect return of valve 32 to its predetermined home position (either normally open or normally closed) via rotation of actuating shaft 34.

Thus, a single drive motor 12 is used to transmit appropriate energy selectively to a bias member 18, such as a spring 54, or to an actuating shaft 34 via a coupling 28, depending upon whether input shaft 24 is locked or unlocked. Planetary gear head assembly 46 further operates to transmit bias force from bias member 18 when brake 35 is released, via bias shaft 20, through planetary gear head 46, to coupling 28 when drive shaft 14 is locked, such as when power is lost.

Figure 5A:
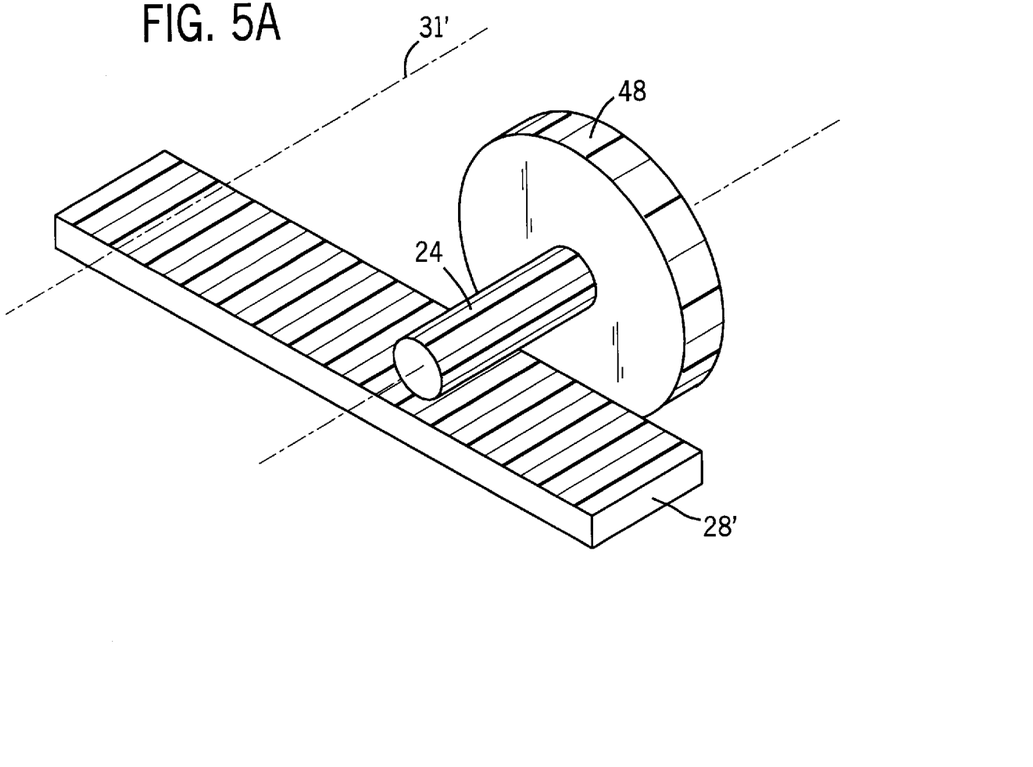
FIG. 5 is a schematic perspective illustration of alternate output arrangements available for use with the preferred embodiment of the present invention.
Figure 5B:
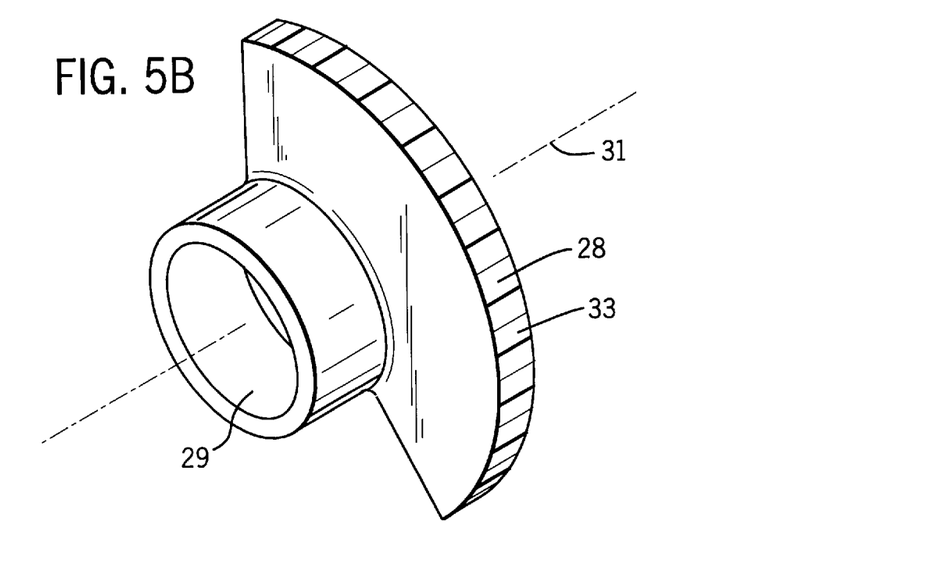

FIG. 5 is a schematic perspective illustration of alternate output arrangements available for use with the preferred embodiment of the present invention.

In FIG. 5, transmission gear 48 and its attached input shaft 24 are illustrated as being configured for providing input to a drive member 22 (FIG. 1) via a rack and pinion arrangement through a rack 28'. Thus, a pinion gear (illustrated schematically in FIG. 5) may be attached to or incorporated into input shaft 24, and rack 28' may be appropriately configured for engaging interaction with the pinion gear of input shaft 24 to provide a rack and pinion coupling to a drive member 22 for apparatus 10. Appropriate configuration of apparatus 10, with room to allow rack 28' to be slidingly disengaged from the pinion gear associated with input shaft 24, facilitates replacement of rack 28' with a sector gear coupling 28. Axis 31 of coupling 28 may be substantially aligned with an axis 31' to facilitate meshing engagement of a face 33 of coupling 28 with the pinion gear associated with input shaft 24. In such manner, quick change of an actuating arrangement between a rack and pinion coupling arrangement and a sector gear coupling arrangement may be easily and quickly effected.

Thus, the invention is a return-to-normal apparatus 10 usable for actuating devices such as a valve or damper 32. Apparatus 10 initially winds an internal return spring 54 and then decouples spring 54 from input shaft 24 to drive member 22. Thus, a single drive motor 12 drives the load (e.g., valve 32) and only the load applied to input shaft 24 to drive member 22 during normal operation. Once power to apparatus 10 is removed, spring 54 is coupled to input shaft 24 and spring 54 drives valve 32 to its predetermined normal position, such as a normally open or a normally closed position. In its preferred embodiment, the apparatus has both a linear (e.g., rack and pinion) version and a rotary (e.g., sector gear) version. Apparatus 10 is preferably directly mounted to a valve or damper 32 and employs a small stepper motor and a spring, approximately 2¼ inches in diameter and ½ inch thick. Most parts from the linear version are used in the rotary version. Spring 54 moves only during the return-to-normal cycle, and during a subsequent recovery cycle when the spring is rewound.

Transmission member 16 includes a gearing mechanism, preferably in the form of a planetary gear head assembly 46, which splits the power from drive motor 12 in two paths: A first path to input shaft 24, and a second path to bias shaft 20. When drive shaft 14 is locked, a third path is formed through planetary gear head assembly 46 between bias member 18 via bias shaft 20 and input shaft 24 to drive member 22.

In normal operation, after spring 54 has been wound, and that wound state is sensed by logic/control device 36 via network 38, spring 54 is held stationary by brake 35. Brake 35 is preferably embodied in a solenoid brake. Thus, in normal operation, drive motor 12 is free to actuate valve 32 (or damper) without having to wind and unwind spring 54. When drive member 22 is not being commanded to move, drive motor 12 has sufficient detent torque to hold valve 32 (or damper) in position.

Under return-to-normal operation (e.g., during power failure), brake 35 loses power, which loss of power is sensed by logic/control device 36 via network 38. As a result, logic/control device 36 releases solenoid brake 35 which consequently releases spring 54. Alternately, the solenoid of brake 35 may be directly powered by the power source for apparatus 10. In such case, a loss of electrical power will cut power to the solenoid, which will release brake 35. The detent torque of drive motor 12 is sufficient to prevent drive motor 12 from turning in response to the bias force applied to bias shaft 20 so that power from spring 54 is routed to input shaft 24, through drive member 22, thus returning valve 32 to its home position.

When power is restored after a power failure, or upon initial energization of apparatus 10, brake 35 is not immediately energized. First, spring 54 must be wound or rewound. This winding or rewinding is done by energizing drive motor 12 to move in a direction which urges valve 32 to its home position. Once valve 32 reaches its home position (a limit of its travel), input shaft 24 is effectively locked and power from drive motor 12 will be transferred to spring 54 (FIG. 2). Drive motor 12 then proceeds to wind up spring 54 a predetermined number of turns (controlled by logic/control device 36) to effect appropriate winding of spring 54. Preferably, spring 54 is only wound far enough to enable spring 54 to return valve 32 (or damper) to its home position. Torque produced by spring 54 increases as spring 54 is wound further. The more torque produced by spring 54, the greater the stress experienced by spring 54. Drive member 22 and spring 54 are designed for a maximum stroke, but most valves and dampers have stroke less than this maximum. Because logic/control device 36 "knows" what the stroke of valve 32 (or damper) actually is, winding spring 54 completely can be avoided. This will also reduce stresses on transmission member 16 and on valve 32 (or damper).

Once winding or rewinding is accomplished, brake 35 is energized to hold spring 54 in its wound position. Thus, in the preferred embodiment, brake 35, through coupling 37, engages and holds bias shaft 20 and effectively removes spring 54 from the power path through transmission member 16. That is, any further movement imparted by drive motor 12 to transmission member 16 via drive shaft 14 will now be transferred to input shaft 24 (FIG. 3).

Preferably, apparatus 10 is shipped with spring 54 completely unwound within its case 56. Further, apparatus 10 is preferably shipped with actuator shaft 34 at either of its extremes of travel. Input shaft 24, as previously described, will not be movable by hand because of the detent torque of drive motor 12.

After valve 32 (or damper) is attached to actuator shaft 34, apparatus 10 is ready to be turned on for the first time, and logic/control device 36 must execute an initialization routine. In such an initialization routine, it is presumed that spring 54 is completely unwound. Brake 35 is first energized to keep spring 54 from being wound. Drive motor 12 is energized in the direction that moves valve 32 away from the home position until drive motor 12 stalls. Logic/control device 36 assumes that the position at which drive motor 12 stalls is the extreme of valve 32 travel away from the home position. Drive motor 12 is then cycled in the opposite direction until it stalls. Logic/control device 36 presumes that this position of second stalling of drive motor 12 is the home position of valve 32.

Logic/control device 36 preferably counts steps from the position reached at extreme of travel away from the home position by valve 32 until valve 32 reached the home position. Thus, logic/control device 36 now "knows" that valve 32 (or damper) is in the home position, and further knows the number of steps to traverse a full stroke from one extreme of travel to the other extreme of travel by valve 32. Logic/control device 36 saves this stroke length in memory 40 (FIG. 1), preferably a permanent non-volatile memory.

After having cycled valve 32 back to the home position, as described above, the initialization routine continues as brake 35 is deenergized and drive motor 12 continues to turn in a direction to drive valve 32 to the home position. Since valve 32 is already home, motor power from drive motor 12 will be transferred by planetary gear head assembly 46 to bias shaft 20 and, ultimately, to spring 54 as described above. Thus, spring 54 will be wound. Drive motor 12 will turn bias shaft 20 a programmed number of turns to fully wind spring 54. At this point in the initialization routine, brake 35 is energized to lock spring 54 in position. This completes the initialization routine. If at any future time apparatus 10 is removed from valve 32, the initialization routine will have to be rerun.

It is important to note that brake 35 is not based on a separate DC motor, as in some prior art designs of such actuators. Brake 35 in the preferred embodiment of the present invention is based on a solenoid. One advantage of such a configuration is that brake 35 does not require circuitry to discharge a capacitor through drive motor 12 to release spring 54. Spring 54 is instead released automatically upon interruption of power to the solenoid associated with brake 35. Of course, it may be advisable to place a capacitor across the solenoid of brake 35 to prevent nuisance trips. Once brake 35 is released and spring 54 begins to return valve 32 to its home position, apparatus 10 preferably should be allowed to complete the return-to-normal cycle so that logic/control device 36 "knows" where spring 54 is and where valve 32 is.

A particular advantage of the preferred embodiment of the present invention is that it is possible to change the home position for stem-up or stem-down configuration, or to change from clockwise to counterclockwise actuation very easily. To facilitate such a change, spring 54 is generally shipped in an unwound condition. That is, spring 54 is loosely contained within case 56 and engages case 56 by a tab 55 in a slot 57. Thus, to change the action of apparatus 10 from one direction to another (e.g., from stem-up to stem-down, or from clockwise to counterclockwise), one must detach (or not yet have attached) apparatus 10 from valve 32. Power to apparatus 10 must be off, and spring 54 must be completely unwound. Tab 55 is disengaged from slot 57 to facilitate removal of spring 54 from case 56. Spring 54 may then be rotated 180 degrees, reinserted in case 56, and tab 55 reengaged with slot 57. In such manner, the direction for winding spring 54 is reversed so that the return-to-normal force provided by unwinding spring 54 and transmitted through bias shaft 20 is reversed. Apparatus 10 should, in such a configuration, provide a switch, or jumper, or other means by which an installer can indicate to logic/control device 36 in which direction the home position is located.

In the preferred embodiment of the present invention, a manual override is provided by which a pinon is attached to a thumb wheel (not shown) accessible to a user. When the thumb wheel is pushed in, the pinion engages one of the gears between drive motor 12 and planetary gear head assembly 46, and a lever applies braking pressure to return spring 54. If the thumb wheel is then turned, while still being pushed inward, drive motor 12 and valve 32 will also move (spring 54 being held stationary). In such manner, valve 32 can be moved manually whether or not there is power to apparatus 10. It is important to note that a user operating such a manual override with the present invention does not have to overcome the torque of spring 54, since spring 54 is locked by brake 35. A small catch near the thumb wheel can be used to latch the thumb wheel in place so that apparatus 10 can remain in a predetermined position indefinitely. If drive motor 12 starts to turn because of an application of electrical power while the manual override is in such a latched condition, the manual override is configured to automatically unlatch and apparatus 10 will then return to a normal non-override condition.

Further in the preferred embodiment of the present invention, apparatus 10 is converted from linear operation to rotary operation very simply as follows. Input shaft 24 has incorporated or mounted thereon a pinion gear (schematically illustrated in FIG. 5) for engaging a sector gear such as actuator 28 for rotary motion. Preferably, the frame of apparatus 10 is designed to attach either to a casting to which a valve is attached or to a casting enclosing a hollow output shaft and sector gear to which a damper is attached. Either casting may be attached to apparatus 10 with screw(s). Conversion from linear actuation to rotary actuation is accomplished simply by removing the casting which attaches to valves by removing appropriate screw(s), sliding out the rack assembly by using the manual override mechanism described above, and then attaching the casting which encloses the output shaft and sector gear by reinstalling appropriate screw(s). Any associated auxiliary switches, or feedback potentiometers, or other sensors associated with apparatus 10 must then be reset to correctly reflect the converted apparatus 10 as been mounted to a valve 32 or a damper.

Figure 6:
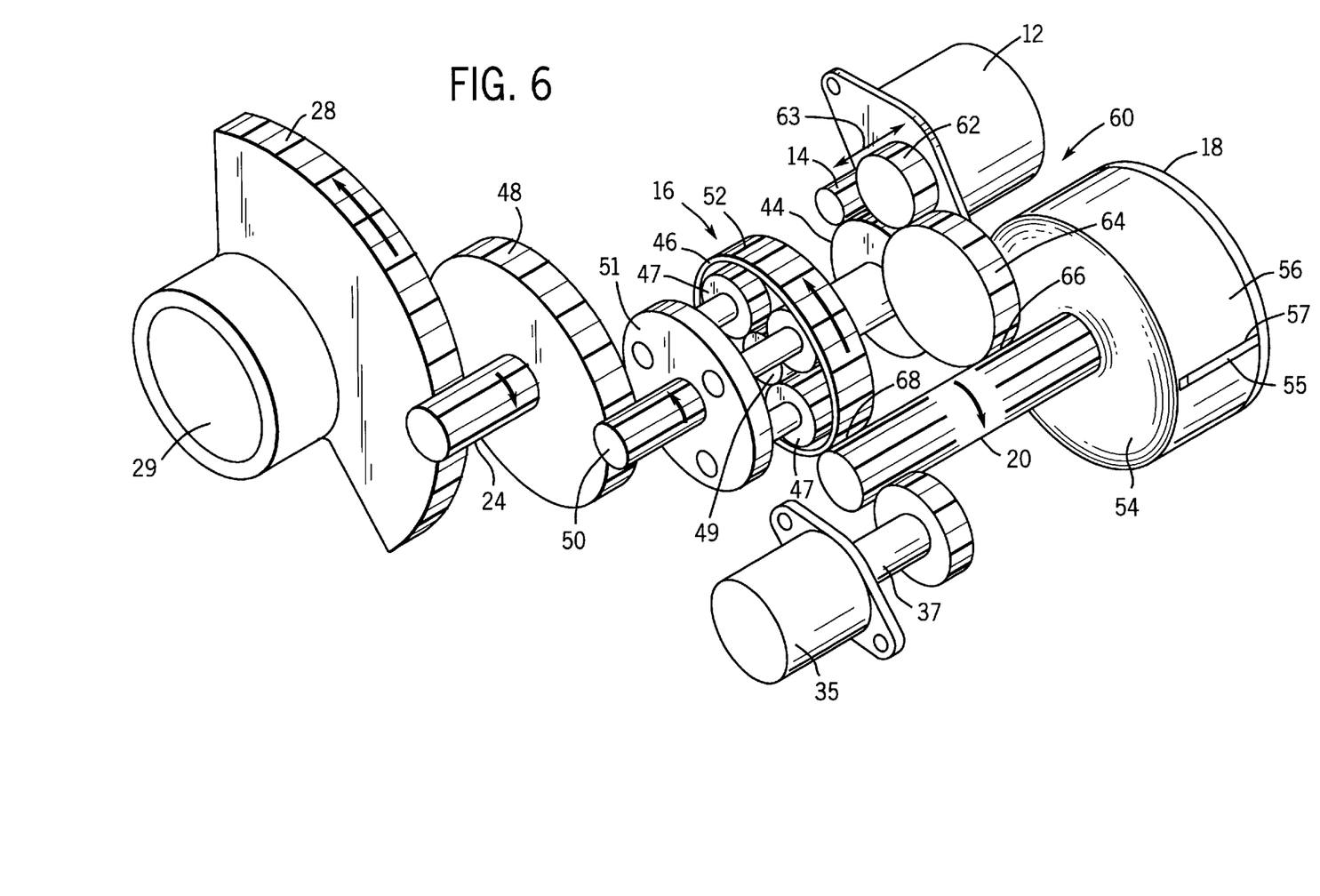
FIG. 6 is a schematic perspective illustration of details of the drive train of an alternate preferred embodiment of the present invention.

With reference to FIG. 6, an additional embodiment of the apparatus 10' is illustrated. Like reference numerals are used to identify like components of proceeding embodiments. Apparatus 10' includes a second gear train arrangement 60 for shunting driving torque around the output gear train 16 for winding the return spring 54. Apparatus 10' therefore provides for winding the spring 54 without transferring torque through the output gear train 16 and without loading the actuated device. Output gear train 16 is coupled to drive gear 44 and drive motor 12 for supplying driving torque thereto. The output gear train 16 is as described above with respect to apparatus 10 for actuation of the device.

The second gear train 60 is coupled to drive motor 12 by clutch gear 62 which selectively couples driving torque from drive motor 12 to spring gear 64. It is contemplated that clutch gear 62 will be adapted to a suitable solenoid for selectively engaging and disengaging clutch gear 62 between drive motor 12 and spring gear 64 by moving the clutch gear in directions indicated by the two headed arrow 63 as is well known in the art. Spring gear 64 engages gear teeth 66 of spring shaft 20 for transferring torque for winding return spring 54. Spring shaft 20 is further formed with addtional gear teeth 68 which engages external gear teeth formed on ring gear 52 of output gear train 16. Depending on required gear ratios and drive sense, spring shaft 20 may be adapted with a gear member or adapted to engage an intermediate gear member for engaging ring gear 52. Solenoid brake 35 is further provided and is adapted to engage the gear teeth 68 of spring shaft 20 for selectively locking spring shaft 20 against rotation when power is supplied to the actuator and the spring is wound.

In operation, when the apparatus 10' is initially energized, or energized after a power failure, spring 54 is typically in a substantially unwound state. Power is applied to apparatus 10' and a controller, not shown in the figure, directs apparatus 10' to wind the spring 54. Solenoid brake 35 is released and the clutch gear 62 is engaged between drive motor 12 and the spring gear 64, and solenoid brake 35 is released. Power is supplied to drive motor 12 and driving torque is transferred to spring 54. Concomitantly, rotation of spring shaft 20 causes a counter rotation of the ring gear 52 effectively canceling output rotation of transmission gear 48 through output gear train 16. In this manner, spring 54 is wound without transferring torque through output gear train 16 or to the actuated device. Preferably drive motor 12 provides two torque outputs, a first for normal operation of the device and a second, higher torque output, for winding spring 54 under direction of the controller.

When spring 54 fully wound, as determined by a sensed stall condition of drive motor 12 by the controller, solenoid brake 35 is set inhibiting rotation of spring shaft 20 maintaining the energy stored in spring 54 and clutch gear 62 is disengaged. Apparatus 10' may then be normally operated with driving torque being transferred through output gear train 16 to transmission gear 48 and hence to the actuated device. Upon a power loss, solenoid brake 35 is released and the energy stored in return spring 54 causes rotation of spring shaft 20 which is transferred to ring gear 52. Drive motor 12 has sufficient detent torque in conjunction with the relatively high gear reduction between transmission gear 48 and drive motor 12 to inhibit rotation of input gear 44, and driving torque from return spring 54 is transferred through output gear train 16 to return the actuated device to the home position. In this manner, apparatus 10' provides for winding spring 54 without torque loading output gear train 16 and the actuated device. It is desirable to avoid torque loading certain actuated devices, such as smaller valves, to prevent damage to these devices.

It is to be understood that, while the detailed drawings and specific examples given describe preferred embodiments of the invention, they are for the purpose of illustration only, that the apparatus of the invention is not limited to the precise details and conditions disclosed, and that various changes may be made therein without departing from the spirit of the invention which is defined by the following claims.

We claim:

1. An apparatus for effecting actuation of a positioning member, the apparatus being adapted to return the positioning member to a first position upon loss of power, the apparatus comprising:

a drive motor having a drive shaft;

a bias assembly including a bias member for storing kinetic energy;

a first gear train coupled to receive driving torque from the drive shaft, and having a drive member for applying the driving torque to the positioning member;

a second gear train having a clutch mechanism adapted to selectively couple driving torque from the drive shaft to the bias member, independent of the first gear train, to store kinetic energy in the bias member.

2. The apparatus of claim 1 wherein the second gear train further includes a spring gear connected to the bias member, and wherein the clutch mechanism comprises a clutch gear selectively engaging the drive shaft and the spring gear.

3. The apparatus of claim 1 wherein the first gear train has a planetary gear head assembly which comprises sun gear coupled to the drive shaft, a ring gear, and a plurality of planetary gear attached to a carrier member and engaging both the sun gear and the ring gear, wherein the carrier member transfers force to the drive member.

4. The apparatus of claim 1 further comprising control logic which provides a positioning signal to the drive motor for effecting actuation of the positioning member toward a second position, and which monitors a characteristic of the positioning signal to determine when the positioning member is in the second position.

5. The apparatus of claim 4 wherein the characteristic indicates a stall condition of the drive motor.

6. The apparatus of claim 4 wherein the control logic is adapted to provide a bias signal to the drive motor and to the bias assembly for effecting storage of kinetic energy in the bias member.

7. The apparatus of claim 6 wherein the drive motor provides a first driving torque output in response to the positioning signal and second driving torque output in response to the bias signal.

8. The apparatus of claim 6 wherein the bias assembly further comprises a brake coupled to the bias member to permit storage of kinetic energy in the bias member in response to the bias signal and to prohibit storage of kinetic energy in the bias member in the absence of the bias signal.

9. The apparatus of claim 8 wherein the brake is responsive to a loss of power to the apparatus by enabling the bias member to release stored kinetic energy.

10. The apparatus of claim 4 wherein the control logic is adapted to determine if the positioning member has exceeded one of the first and second positions.

\* \* \* \* \*